Aug. 3, 1965    K. F. ROSS    3,199,116
PROJECTION OF STEREOSCOPIC PICTURES
Filed May 29, 1962
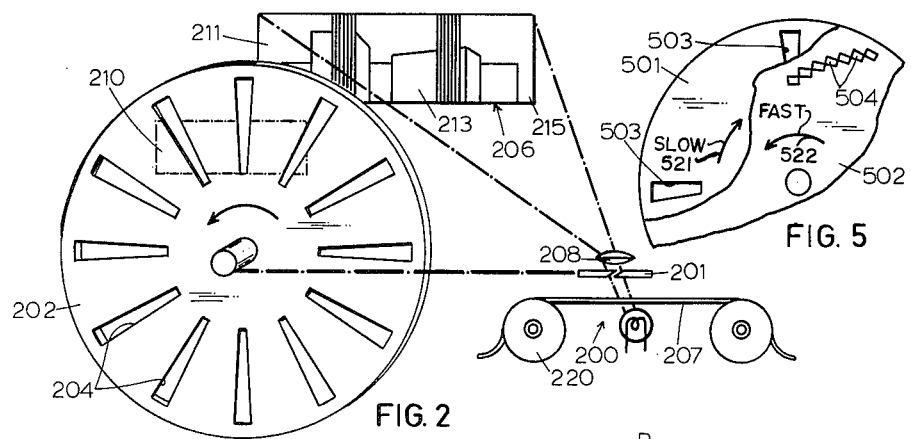
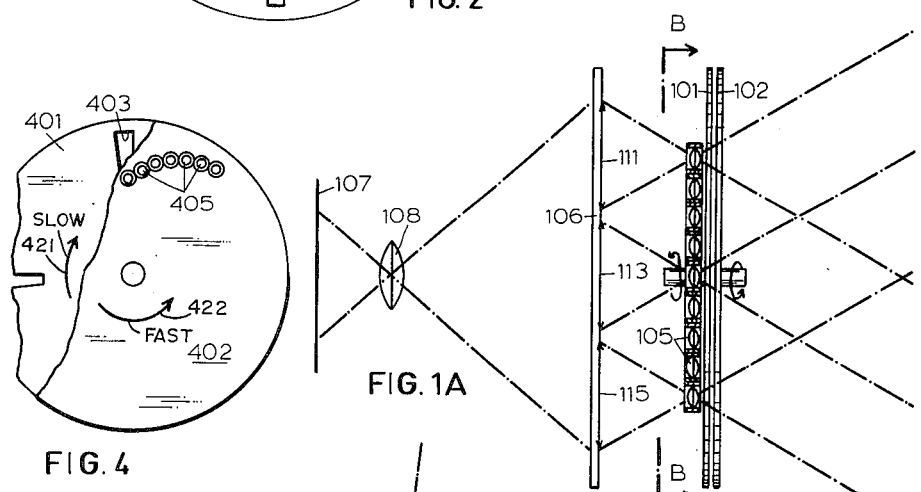
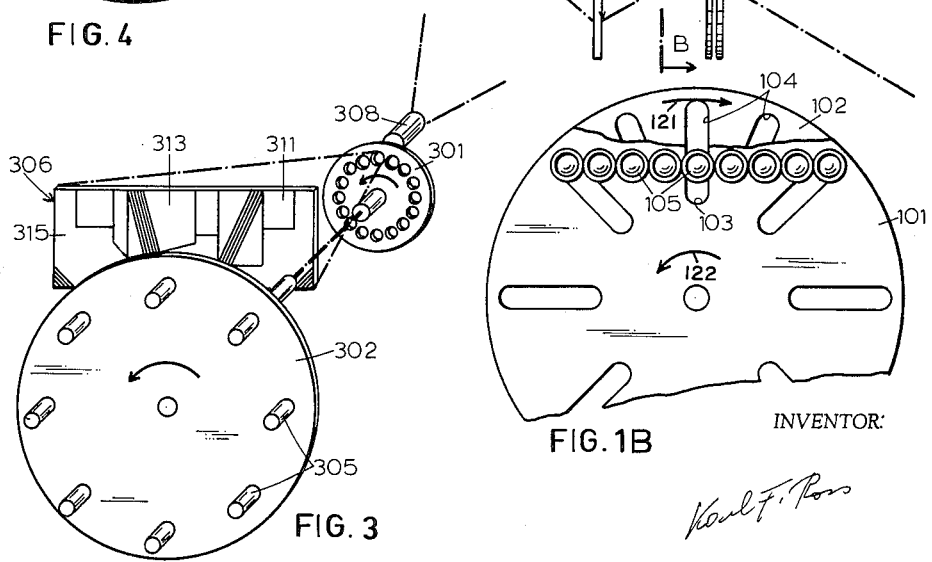
INVENTOR:
Karl F. Ross 3,199,116
PROJECTION OF STEREOSCOPIC PICTURES
Karl F. Ross, 305 Broadway, New York 7, N.Y.
Filed May 29, 1962, Ser. No. 198,684
4 Claims. (Cl. 352—58)

This application is a continuation-in-part of Serial No. 688,566, filed October 7, 1957, now Patent No. 3,046,-330, issued July 24, 1962.

My present invention relates to a system for projecting pictures in such manner as to give a viewer the impression of observing a scene in three dimensions.

It has already been proposed to create such impression from a composite picture, known as a parallax panoramagram, which consists of a multiplicity of strip images viewable as an array of cylindrical lenses coextensive therewith. Various systems for realizing this idea have been disclosed in my copending application Ser. No. 688,-566, filed October 7, 1957, now Patent No. 3,046,330, issued July 24, 1962, of which the present application is a continuation-in-part.

The object of my present invention is to provide a projection system of this general type in which, however, the available projection surface is utilized not simultaneously but successively for the display of the several component images of the parallax panoramagram whereby each of these images may be spread over a substantially large part of such surface.

This object is realized, in accordance with the present invention, by the provision of a projector which successively flashes a sequence of component images upon the projection screen within a time interval shorter than the period of visual retention of the human eye, i.e. less than $\frac{1}{16}$ of a second, in combination with means intermittently forming optical slots in front of the receiving surface and at a sufficient distance therefrom to enable viewers at different locations, as also the two eyes of each viewer, to see different parts of the same component image. The slots may be formed in a rotary body such as a disk of large diameter whose rotation is suitably synchronized with the projection of the images, e.g. in combination with a second slotted disk rotating with different speed and/or direction.

The invention will be described in further detail with reference to the accompanying drawing in which:

FIG. 1A is a top plan view of an embodiment of a cinematographic recording system according to the invention using slotted light-channeling members;

FIG. 1B is an elevational view taken on the line B—B of FIG. 1A;

FIG. 2 is a perspective, partly diagrammatic view of a reproducing system correlated with the apparatus of FIGS. 1A and 1B;

FIG. 3 is a perspective view of a modified recording system adapted to be used in conjunction with a reproducing system similar to that of FIG. 2;

FIG. 4 is an elevational view of the light-channeling members of a recording system representing a further modification; and FIG. 5 shows part of a reproducing system correlated with the system of FIG. 4.

In FIGS. 1A and 1B there is shown an apparatus for taking stereoscopic pictures with the aid of a pair of relatively rotatable, slotted disks 101, 102 of opaque material which serve as light-channeling means. Disk 101, rotating counterclockwise (as viewed in FIG. 1B, see arrow 121) under the control of a driving mechanism not shown, is provided with a series of radial slots 103; disk 102, rotating in the opposite direction as indicated by an arrow 122, has similar slots 104 whose angular spacing has been shown as only half that of slots 103. Behind the rear disk 101, at the level of the slots, there is provided a stationary array of objectives 105 adapted to photograph, through the registering slots 103 and 104, overlapping portions of a scene located in FIG. 1A to the right of the rotating unit 101, 102, the speeds of the disks and the spacing of their slots being so chosen that, by virtue of a progressive displacement of the aligned slot positions (from right to left in FIG. 1B), each objective 105 becomes operative once during an operating cycle whose duration should be less than the period of visual retention of the human retina which is approximately $\frac{1}{16}$ of a second. In the image plane of these objectives there is positioned a ground-glass plate 106 upon which the images formed by them are projected; these images are then photographed, on a film 107, by the objective 108 of a motion-picture camera so synchronized with the coaxial disks 101, 102 that a new frame of the film is aligned with the objective 108 whenever a different objective or group of objectives 105 becomes operative. In the embodiment illustrated, either two or three objectives 105 operate simultaneously to project upon the plate 106 a corresponding number of non-overlapping images such as those indicated at 111, 113, 115 forming part of a parallax panoramagram. With this arrangement, using nine objectives 105, there will be four frames per operating cycle; in practice, however, the number of such objectives will generally be much larger. While the disk 101 is not essential to the operation of this system, its presence causes a symmetrical blocking and unblocking of the ray paths through each of the auxiliary objectives 105.

It will be understood that the slots 103, 104 need not be physical voids but may comprise transparencies, such as glass plates. The same applies to the slots 204 formed in a disk 202 of the reproduction system of FIG. 2, the rotation of this disk being synchronized with the operation of film-feeding means 220 and the shutter 201 of a motion-picture projector 200 whose lens 208 projects the composite pictures on film 207 upon a screen 206. Thus, an observer positioned in front of the disk 202 will be able to view, through its slots 204, the pictures intermittently appearing on that screen.

Projector 200 operates to flash upon screen 206 a plurality of pictures 211, 213, 215, corresponding to the images 211, 213, 215 of FIG. 2, whenever some of the slots 204 are in an angular position, relative to screen 206, corresponding to the angular position, relative to plate 106, of those objectives 105 by which the said images had been produced. Thus, in the course of one operating cycle as defined above, disk 202 in conjunction with shutter 201 scans the screen 206 even as the disks 101 and 102 at the recording apparatus scan the objectives 105 during such cycle. It will be understood that the shutter 201 may be replaced or supplemented by a second, oppositely rotating disk similar to disk 101 and that, conversely, either or both of the disks in FIGS. 1A, 1B may be coupled with a camera shutter, e.g. as illustrated in FIG. 3. Naturally, the desired progression of the panoramagram across the screen 206 requires that the shutter 201 opens with the slots 204 in the illustrated position as well as in intervening ones.

It will be noted that the pictures 211, 213, 215 are similar to the pictures 1', 3' and 5', respectively, of FIG. 1 of my aforementioned patent and that the slots 204 take the place of the curtain slots 1, 3 and 5 thereof in regard to these pictures. The operation of the system of FIGS. 1A, 1B and 2 should, therefore, be readily understood from the theoretical explanations given in that patent. Since the slots 204 are inclined to the vertical in each except a central position, there will be some distortion of the stereoscopic picture seen by an observer which, however, will be small if the apparent field of view (indicated in dot-dash lines at 210) extends over a small angle of disk 202.

In FIG. 3 a rotatable disk 302 carries a set of angularly spaced objectives 305 replacing the stationary objectives 105 of FIGS. 1A and 1B. The images picked up by these objectives are projected upon a ground-glass plate 306, as illustrated at 311, 313 and 315, in successive angular positions selected by a camera shutter 301 which is positioned in front of camera objective 308 and synchronized with the disk 302 for joint counterclockwise rotation to open in the illustrated position of objectives 305 as well as in intervening ones. The pictures taken by the objective 308 may again be reproduced on the apparatus of FIG. 2; the arcuate path of objectives 305 may result in some curvature of the stereoscopic picture which may be minimized by making the radius of disk 302 as large as possible.

FIG. 4 shows a modified scanner for a motion-picture recording apparatus comprising two oppositely rotating disks 401 and 402. Disk 401 is provided with a series of angularly spaced slots 403, slanted at a small angle with respect to the radial direction, and rotates clockwise at low speed; disk 402 carries a set of objectives 405, arrayed along a curved line within an annular zone registering with the slots 403, and rotates counterclockwise at high speed. As the slot 403 at the top of disk 401 advances by a small angle, the rapidly moving objectives 405 successively register with it so as effectively to scan an approximately radial or vertical line. After a nearly full rotation of disk 402 the objectives 405 encounter the same slot in a different angular position so as to scan another approximately radial line; owing to the provision of several slots 403, a plurality of such lines are scanned in a single sweep even as a plurality of the slots 103 operatively register in progressively displaced positions with respective slots 104 in FIG. 1B. Through proper choice of speeds, in respective directions of rotation indicated by arrows 421 and 422, it will thus be possible, with the arrangement of FIG. 4, to scan a scene in two dimensions and to enable the reproduction of a horizontally and vertically stereoscopic picture by complementary apparatus, such as the system of FIG. 2 in which the scanner 202 has been replaced by a device as shown in FIG. 5.

The two-dimensional scanner of FIG. 5, complementary to that of FIG. 4, comprises a pair of disks 501, 502 rotating slowly clockwise and rapidly counterclockwise, respectively, as indicated by arrows 521 and 522. Disk 501 is formed with angularly spaced slots 503 which are similar, in spacing and positioning, to the slots 403 but increase in width toward the disk periphery. Disk 502 is provided with a series of generally trapezoidal apertures 504 whose positions correspond to those of objectives 405 on disk 402 and which may be regarded as portions of a disk sector relatively offset by a constant angle. Thus, the system of FIG. 5 will be capable of producing in front of a viewing screen, such as the screen 206, a scanning sweep substantially identical with that produced by the system of FIG. 4 in front of a projection surface, such as the plate 106 or 306.

While I have described in detail several representative embodiments of my invention, I have not attempted to exhaust the many other modifications, substitutions and combinations which, in the light of this disclosure, will readily occur to persons skilled in the art and which I intend to include in the scope of the invention as defined in the appended claims.

I claim:

1. A system for displaying stereoscopic pictures, comprising a viewing surface, projector means for consecutively flashing upon said surface a succession of images within an interval less than the period of visual retention of the human eye, said images together constituting a parallax panoramagram, a pair of rotatable disks coaxially disposed forwardly of said surface and provided with peripherally spaced slots through which different parts of each image are visible to the eyes of a viewer in front of said disks upon initial alignment of the respective slots thereof, and mechanism for rotating said disks in opposite directions with progressive displacement of the aligned positions of said slots across said surface in timed relationship with the projection of said images.

2. A system according to claim 1 wherein the slots of one disk extend substantially radially while those of the other disk have portions angularly staggered with reference to the direction of the slots of one disk whereby the last-mentioned slots sequentially align with said sections, each such alignment being timed to coincide with the projection of a different image.

3. A system according to claim 1 wherein said projector means includes shutter means synchronized with said disks.

4. A system for displaying stereoscopic pictures, comprising a viewing surface, projector means for consecutively flashing upon said surface a succession of groups simultaneously presented images within an interval less than the period of visual retention of the human eye, said images together constituting a parallax panoramagram, a pair of rotatable disks coaxially disposed forwardly of said surface and provided with peripherally spaced slots through which different parts of each image of a group are respectively visible to the eyes of a viewer in front of said disks upon mutual alignment of corresponding groups of respective slots thereof, and mechanism for rotating said disks in opposite directions with progressive horizontal displacement of the aligned positions of said groups of slots across said surface in timed relationship with the projection of said images.

References Cited by the Examiner

UNITED STATES PATENTS

| | | | |
|---|---|---|---|
| 2,012,995 | 9/35 | Ives | 352—57 |
| 2,238,629 | 4/41 | Deninson | 352—44 |
| 2,331,941 | 10/43 | Terwilliger | 352—44 |
| 2,661,651 | 12/53 | Stipek | 352—58 |
| 2,810,318 | 10/57 | Dockhorn | 352—63 |

FOREIGN PATENTS 347,657    4/37    Italy.

JULIA E. COINER, *Primary Examiner.*